(12) United States Patent
Gopalakrishnan et al.

(10) Patent No.: US 10,129,119 B2
(45) Date of Patent: Nov. 13, 2018

(54) SYSTEMS AND METHODS FOR ANALYZING REPORT ACCESS DATA

(71) Applicant: MasterCard International Incorporated, Purchase, NY (US)

(72) Inventors: Suresh Gopalakrishnan, Ballwin, MO (US); Kim J. Murphy, Wentzville, MO (US); Probal Ghosh, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 162 days.

(21) Appl. No.: 15/287,966

(22) Filed: Oct. 7, 2016

(65) Prior Publication Data

US 2018/0102952 A1 Apr. 12, 2018

(51) Int. Cl.
*G06F 15/173* (2006.01)
*H04L 12/26* (2006.01)
*H04L 29/08* (2006.01)

(52) U.S. Cl.
CPC .............. *H04L 43/08* (2013.01); *H04L 43/04* (2013.01); *H04L 67/02* (2013.01); *H04L 67/306* (2013.01)

(58) Field of Classification Search
USPC ....... 709/203, 206, 217, 219, 223, 224, 226, 709/228, 230, 232, 238; 705/14.42, 705/14.64, 16; 370/241
See application file for complete search history.

(56) References Cited

U.S. PATENT DOCUMENTS

| | | | |
|---|---|---|---|
| 7,730,092 B2 | 6/2010 | Lawson et al. | |
| 8,095,558 B2 | 1/2012 | Barley et al. | |
| 8,250,045 B2 | 8/2012 | Er et al. | |
| 8,311,888 B2 * | 11/2012 | Ramer | G06F 17/30905 |
| | | | 705/14.64 |
| 8,521,719 B1 | 8/2013 | Acharya et al. | |
| 8,554,631 B1 * | 10/2013 | Barton | G06Q 20/20 |
| | | | 705/16 |
| 8,601,592 B2 | 12/2013 | Faitelson et al. | |
| 8,843,814 B2 | 9/2014 | Lord | |
| 8,935,285 B2 | 1/2015 | Acharya et al. | |
| 9,201,979 B2 * | 12/2015 | Ramer | G06F 17/30749 |
| 9,317,685 B1 | 4/2016 | Ramarao | |
| 2004/0098366 A1 | 5/2004 | Sinclair et al. | |
| 2011/0179143 A1 | 7/2011 | Yairi | |

(Continued)

*Primary Examiner* — Quang N Nguyen
(74) *Attorney, Agent, or Firm* — Armstrong Teasdale LLP

(57) ABSTRACT

An access data analytics system including a processor and a memory is provided. The processor stores an electronic report in the memory. The electronic report is generated based on an electronic report query include a plurality of parameters. The processor also collects access profile data including metadata associated with a user accessing the report, stores the access profile data within the memory, receives an access analytics data request requesting access analytics data associated with the stored report, retrieves the stored access profile data, generates an access analysis table including the access analytics data associated with the stored report based on the retrieved access profile data, and provides an extract including at least a portion of the access analytics data associated with the stored report from the access analysis table to a requestor of the access analytics data request.

24 Claims, 11 Drawing Sheets

(56) References Cited

U.S. PATENT DOCUMENTS

| | | | |
|---|---|---|---|
| 2013/0258865 A1* | 10/2013 | Kovvali | H04W 24/10 370/241 |
| 2014/0289036 A1* | 9/2014 | Aurigemma | G06Q 30/0202 705/14.42 |
| 2015/0006552 A1 | 1/2015 | Lord | |
| 2015/0220548 A1 | 8/2015 | Kritt et al. | |
| 2015/0220599 A1 | 8/2015 | Kline | |

* cited by examiner

FIG. 14

Report Type: ALL

Distinct Report List by Type

Run Date: 08/08/2015
Report ID: sd2000911

| REPORT TYPES | REPORT ID | REPORT NAME | REPORT CREATED DATE |
| --- | --- | --- | --- |
| BIRT | 33 | ALCON Purchase Card Invoice Monthly Invoice File | 02/22/2008 |
| BIRT | 36 | CardHolder Memo Statement | 02/22/2008 |
| BIRT | 37 | General Ledger Export File | 02/22/2008 |
| BIRT | 38 | CAL Mapper with IntemailD | 02/22/2008 |
| BIRT | 40 | SAP PCard Inbound File | 02/22/2008 |
| BIRT | 41 | Pacificorp Monthly Fleet Report | 02/22/2008 |
| BIRT | 42 | Xerox Custom Export | 02/22/2008 |
| BIRT | 43 | CUSTOM Transaction Detail Report | 02/22/2008 |
| BIRT | 47 | Kodak Transaction File | 03/16/2008 |
| BIRT | 48 | P-Card Ross | 03/16/2008 |
| BIRT | 49 | P-Card SAP | 03/16/2008 |
| BIRT | 59 | CAL CH Transmittal Rpt | 08/03/2008 |
| BIRT | 61 | Posting File-US | 03/14/2009 |
| BIRT | 68 | ValleyCrest Expense Report | 05/16/2009 |
| BIRT | 73 | Roche Molecular SAP Mapper | 05/30/2009 |
| BIRT | 74 | Roche Carolina-Colorado Mapper | 06/27/2009 |
| BIRT | 76 | Document Retention Report | 07/26/2009 |
| BIRT | 78 | Posting File-EMEA Version 1-3 | 07/26/2009 |
| BIRT | 81 | P-Card Routing Form | 07/26/2009 |
| BIRT | 82 | ALCON Travel Event Card Invoice Monthly Invoice File | 07/26/2009 |
| BIRT | 82 | Alcon Travel Event Card Invoice | 07/26/2009 |
| BIRT | 100 | Account Statement (v2) | 05/09/2010 |

FIG. 15

Report List by Access Levels — 1500

Access Level: ALL

| ACCESS LEVEL | REPORT NAME | RPT_TYPE_CD | ENTITY_CD | ENTITY_ID | ASSIGN_IGA_SW | ASSIGN_CGA_SW |
|---|---|---|---|---|---|---|
| Account | 1099 Tax Report | WF | 1 | 1861 | Y | Y |
| Account | Access as User Audit Report | WF | | | Y | Y |
| Account | Account Activity Spending Alerts | WF | | | N | N |
| Account | Account Detail Report - Sort by Amount | WF | 1 | 21 | N | N |
| Account | Account Detail Report - Sort by Amount | WF | 1 | 21 | N | N |
| Account | Account Statement | WF | | | N | N |
| Account | Account Statement (Version 2) | WF | | | N | N |
| Account | Account Statement Expanded | WF | 1 | 64 | Y | Y |
| Account | Account Statement Report with Signature Lines | WF | | | N | N |
| Account | Account Status | WF | | | Y | Y |
| Account | Accounting Code Detail | WF | | | N | N |
| Account | Accounting Codes Analysis | WF | | | N | N |
| Account | Accounting Software Download | WF | | | N | N |
| Account | Airline City Pair Detail Report | WF | | | Y | Y |
| Account | Airline Summary | WF | | | Y | Y |
| Account | Approver Summary Expense Report | WF | | | N | Y |
| Account | Audit Report | WF | 1 | 1421 | Y | N |
| Account | Audit Report Version 2 | WF | | | Y | Y |
| Account | Authorization Decline Detail | WF | | | Y | Y |
| Account | CTS Data Extract | WF | | | Y | Y |
| Account | Cardholder Self-Registration Report | WF | | | Y | Y |
| Account | Cash Transaction Detail | WF | | | N | N |
| Account | Central Travel Solution Account Statement Report | WF | | | N | N |
| Account | Central Travel Solution Travel Information Report | WF | | | N | N |
| Account | Daily Transaction Summary | WF | | | N | N |
| Account | Delinquency Report (Version 1) | WF | | | Y | Y |
| Account | Delinquency Report (Version 2) for TS2 | WF | | | Y | Y |

SYSTEMS AND METHODS FOR ANALYZING REPORT ACCESS DATA

BACKGROUND

The field of this disclosure relates generally to analyzing data associated with accessing an electronic report and, more particularly, to network-based systems and methods for collecting, storing and analyzing the access data associated with a plurality of electronic reports generated by queries submitted by a client user and executed on a host computing device.

Data is oftentimes generated and stored at a host computing device. Client computing devices, also sometimes called user computing devices, may be able to access the data stored on the host device. In at least some cases, the client devices can generate report queries that are submitted to the host device, placed in a query queue, and then executed by the host device on the data accessible by the host device to generate a report. The queries may include certain parameters that are to be included within or help define the report. The generated report may then include columns and rows of data that satisfy the parameters submitted within the query. In some cases, the parameters may include a schedule for generating the reports. For example, the reports may be scheduled to be generated daily, weekly or monthly. In some other cases, one of the parameters may include a specific language that the user wants the report generated in. For example, some users may want a report presented in English, and others may prefer the report presented in Spanish.

In at least some known cases, client users may request hundreds, if not thousands, of reports from a host device. These reports may be in multiple languages, and may include thousands of columns and rows of data. The generation of these reports can be very time consuming and costly. In addition, these reports may be generated at different access levels. In other words, client users may be assigned an access level for accessing data stored within the host computing device. For example, a lower level sales person within a company may be assigned an access level of 1 for accessing reports of general data stored at the host device; whereas a high level executive within the same company may be assigned an access level of 10 for accessing reports of confidential business data stored at the host device. Thus, different access levels can also be an input parameter for generating reports, and can cause even more reports to be generated.

Each report that is generated by these host devices requires additional computer coding and/or hardware at the host system in order to generate and output the reports. Accordingly, the more reports requested by the user and generated by the host device means the more costs incurred by the host and/or the client requesting the report. In addition, an increase in the number of reports generated also means an increase in the time needed to process such reports.

In at least some cases, reports that are generated for a user client go unused or may only be accessed by a few persons. In other cases, reports may be generated for multiple access levels and/or in multiple different languages, but only one access level of the report and/or a single language of the report is accessed by the client users. Thus, in these examples, numerous versions of these reports are being generated, but not used by the client user. There are no known systems that generate reports, but also that collect, store and analyze access data (i.e., data associated with accessing the report including time of access, date, person, report accessed, access level, etc.) associated with the generated reports.

Accordingly, it would be desirous to have a system that generates reports for client users, and also tracks the user access data associated with such reports and generates an output so that the host and the client know whether the reports are actually needed.

BRIEF DESCRIPTION OF THE DISCLOSURE

In one aspect, an access data analytics system including a processor and a memory processor is provided. The processor receives an electronic report query including a plurality of parameters, generates an electronic report based on the parameters, and stores the report in the memory. The processor also collects access profile data including metadata associated with the user accessing the report for a user accessing the report, stores the access profile data within the memory, receives an access analytics data request requesting access analytics data associated with the generated report, retrieves the stored access profile data, generates an access analysis table including the access analytics data associated with the generated report based on the retrieved access profile data, and provides an extract including at least a portion of the access analytics data associated with the generated report from the access analysis table to a requestor of the access analytics data request.

In another aspect, a method of providing access analytics data for reports is provided. The method is implemented, at least partially, by an access data analytics system. The method includes receiving an electronic report query including a plurality of parameters, generating an electronic report based on the plurality of parameters, storing the report in a memory associated with the access data analytics system, collecting access profile data including metadata associated with a user accessing the report, and storing the access profile data within the memory. The method further includes receiving an access analytics data request requesting access analytics data associated with the generated report, retrieving the stored access profile data, generating an access analysis table including the access analytics data associated with the generated report based at least in part on the retrieved access profile data, and providing an extract of the access analysis table including at least a portion of the access analytics data associated with the generated report to a requestor of the access analytics data request.

In yet another aspect, at least one non-transitory computer-readable storage media having computer-executable instructions embodied thereon is provided. When executed by at least one processor, the computer-executable instructions cause the processor to receive an electronic report query including a plurality of parameters, generate an electronic report based on the parameters, store the report in a memory, collect access profile data including metadata associated with a user accessing the report, and storing the access profile data within the memory. The computer-executable instructions further cause the processor to receive an access analytics data request requesting access analytics data associated with the generated report, retrieve the stored access profile data, generate an access analysis table including the access analytics data associated with the generated report based at least in part on the retrieved access profile data, and provide an extract of the access analysis table including at least a portion of the access analytics data associated with the generated report to a requestor of the access analytics data request.

BRIEF DESCRIPTION OF THE DRAWINGS

The Figures listed below show example embodiments of the methods and systems described herein.

FIG. 14 is an example report type list that includes access analytics data from the system shown in FIG. 1.

FIG. 15 is an example access level list generated from access analytics data from the system shown in FIG. 1.

DETAILED DESCRIPTION

Figure 1:
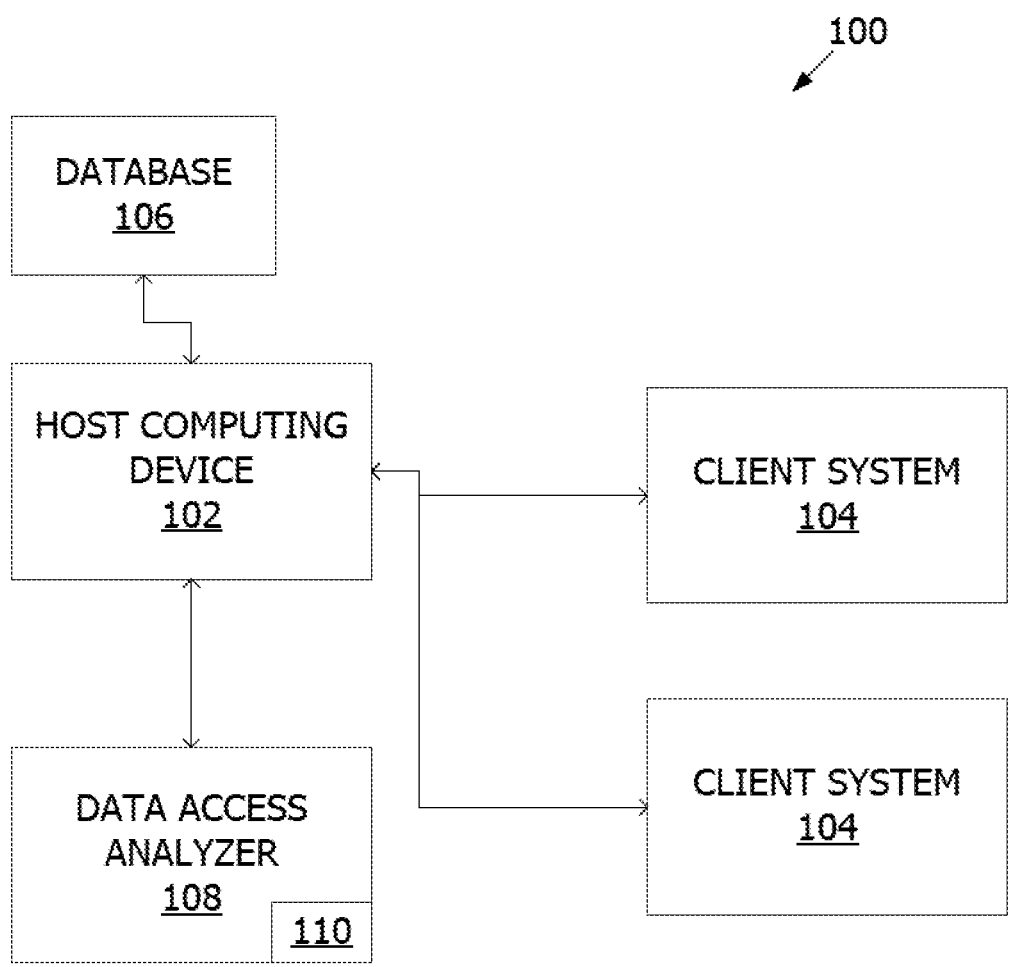
FIG. 1 is a block diagram of an example access data analytics system for generating reports and analyzing data related to users accessing the reports.

The systems and methods described herein generally relate to analyzing data associated with accessing a report and, more particularly, to network-based systems and methods for collecting, storing and analyzing the access data associated with a plurality of reports generated by queries submitted by client users and executed on a host computing device.

The system, referred to herein as an "access data analytics" system, includes a computing device referred to as an access data analyzer that is in communication with a host computing device. In some embodiments, the access data analyzer and the host computing device are the same computing device. The host computing device is configured to retrieve and store data associated with, for example, payment transactions, medical records, product inventory, and other various types of data. The host computing device may be configured to continuously or periodically retrieve additional data for storage.

The host computing device is configured to receive report queries for the stored data to generate one or more reports. As used herein, a "report" refers to an electronic document or file that includes data from the host computing device in a structured format. The report queries include one or more parameters that define or specify a portion of the stored data to be included in the requested reports and settings of the reports. The parameters may include, but are not limited to, languages, report content (i.e., what stored data is included in the report), data fields or elements, access levels, a report schedule, and format settings. The access levels facilitate selective access for the reports and, in some embodiments, to particular portions of a report. For example, an executive may have a higher access level than an entry-level employee, and therefore has an access level that enables the executive to view more reports than the entry-level employee. The report schedule is a recurring time interval for updating the report or automatically generating a new report based on the report query. In one example, reports including payment transaction data may be generated on a monthly or weekly basis for review. For recurring reports, the parameters may be selectively updated or changed.

Based upon the received parameters, the host computing device retrieves the stored data associated with the report query to generate one or more reports. The reports are stored in a memory associated with the host computing device. In the example embodiment, the parameters are stored with the report for subsequent analysis. In other embodiments, the parameters are stored elsewhere, such as at the access data analyzer. A log file documenting previous parameters, related reports, and other information for each report or report query may also be generated and stored with the reports.

Once the reports have been generated, the host computing device enables one or more client systems to access the reports. The client systems are computing devices associated with users with access to the reports. The client systems are in communication with the host computing device through a network, such as the internet or other public or private network, to access and/or retrieve the reports. In at least some embodiments, when a client system attempts to access a report, the host computing device transmits a copy of the report to the client system. The host computing device may provide the reports via a web interface. Each user may be associated with a user profile including information about the user, such as the user's access level, preferred language, and other information.

When a report generated by the host computing device is accessed, the host computing device and/or the access data analyzer collects or generates metadata (also referred to herein as "access profile data") related to the access. For example, the metadata may include an access level of the user, a language of the report accessed, a timestamp of the access, and duration of the access. In at least some embodiments, the user profile of the user accessing the report is retrieved to further generate the access profile data. The access profile data is stored with the accessed report for analysis. In other embodiments, the access profile data is stored elsewhere, such as at the access data analyzer. Access profile data is collected and stored for each access attempt of the reports.

In the example embodiment, the access data analyzer is configured to receive an access analytics data request from a requestor. As used herein, "access analytics data" refers to metrics and analytics that are based at least in part on the access profile data and parameters of a report. The access analytics data may include the access profile data and/or calculated metrics from the access profile data, such as aggregated access profile data for a plurality of reports. In some embodiments, the access analytics data request is a recurring request with a predefined frequency (e.g., monthly, yearly, etc.). The access analytics data request is configured to request information associated with access to the reports. The access data analyzer retrieves the stored access profile data for each report associated with the access analytics data request and the parameters of the reports. The access profile data and the parameters are added to an access analysis table. The access analysis table includes access analytics data associated with the reports. In some embodiments, the access analysis table may be generated for each access analytics data request. In other embodiments, the access analysis table may include access analytics data for each report generated by the host computing device. In such embodiments, the access analytics data for each report may include a query identifier to indicate which report query is associated with the report. The access analytics data may be aggregated or otherwise derived from the access profile data and the parameters. The access analysis table is configured to provide access analytics data for each report individually or for a set of reports.

In some embodiments, the access data analyzer is configured to identify and tag reports that are potentially inactive based on the access analytics data of the access analysis table. As used herein, a report is inactive if the report has not been accessed within a predetermined period of time. For example, if twenty reports are created providing the same data in different languages and seven of those reports were not accessed, the access data analyzer may identify those seven reports that were not accessed since the reports were generated. In some embodiments, the report may be determined to be inactive if the report has been accessed a number of times below a predetermined threshold within the period of time. Tagged reports are identifiable from the access analytics data associated with the tagged reports in the access analysis table. In certain embodiments, the access data analyzer may be configured to identify and tag reports that exhibit other trends or characteristics. For example, the access data analyzer may tag reports that are frequently accessed.

In at least one embodiment, the access data analyzer is configured to automatically remove inactive reports and/or revoke user access to a report based on the generated access analytics data, thereby reducing the computer resources allocated for generating and storing present and/or future reports. In one embodiment, the access data analyzer compares the access analytics data of the access analysis table to at least one predetermined access threshold that represents report access activity (i.e., number of unique accesses over a period of time) to identify an inactive report or a report with a relatively low number of accesses. These identified reports may be automatically deleted or tagged as inactive. In the future, for reports that are deleted or tagged as inactive, the system would override the instructions to generate these reports by the access data analyzer sending a message to the host computing device instructing it to no longer generate the reports that are deemed inactive. In some embodiments, the access data analyzer compares access profile data for each user permitted to access a report to a predetermined user threshold to identify inactive users. Based on the comparison, the access data analyzer may identify users that have not accessed the report in a predetermined period of time. The access data analyzer may be configured to automatically revoke a user's access to the report if the user is identified as inactive. The access data analyzer may be configured to send instructions to the host computing device to update access rules stored in the host computing device to prevent inactive users from accessing the report. More specifically, the access rules are updated to remove the inactive users' permission to view, edit, or otherwise retrieve the report.

The access data analyzer provides an extract of the access analysis table to the requestor associated with the access analytics data request. As used herein, an "extract" refers to at least a portion of the access analytics data from the access analysis table. In some embodiments, the access data analyzer may enable the requestor to select what data is included in the provided extract. For example, one requestor may only want frequency data related to one or more reports, whereas a second requestor may want the frequency data in addition to business group data. In the example embodiment, the access data analyzer is configured to generate one or more access review items based on the provided extract. The access review items may include, but are not limited to, a spreadsheet, a chart, a graph, and a table. The requestor can review the access analytics data to determine if existing or subsequent reports should be adjusted. For example, the requestor may determine reports in a particular language or including particular data are not being accessed and therefore do not need to be generated.

At least one of the technical problems addressed by this system may include: (i) difficulty in identifying bottle neck issues associated with reports and report queries; (ii) difficulty in identifying performance issues associated with reports and report queries; (iii) reduced bandwidth for the active client reports; (iv) increased computation power requirements for generating the reports; and (v) lack of feedback regarding report queries and access to the reports.

The technical effect achieved by this system may be at least one of: (i) improved speed when generating client reports; (ii) improved performance of the host computing device; (iii) increased bandwidth for active client reports; (iv) reduced computation power requirements for generating the reports; and (v) improved feedback regarding report queries and access to the reports.

More specifically, the technical effects can be achieved by performing at least one of the following steps: (a) receiving an electronic report query including a plurality of parameters; (b) generating an electronic report based on the plurality of parameters; (c) storing the report in a memory associated with the access data analytics system; (d) collecting access profile data including metadata associated with a user accessing the report; (e) storing the access profile data within the memory; (f) receiving an access analytics data request requesting access analytics data associated with the generated report; (g) retrieving the stored access profile data; (h) generating an access analysis table including the access analytics data associated with the generated report based at least in part on the retrieved access profile data; and (i) providing an extract of the access analysis table including at least a portion of the access analytics data associated with the generated report to a requestor of the access analytics data request.

As used herein, a "processor" may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" or "memory" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to managing computing infrastructures.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a simplified block diagram of an exemplary access data analytics system 100 in accordance with one embodiment of the present disclosure. System 100 is configured to capture and analyze access profile data associated with data reports. In the example embodiment, system 100 includes a host computing device 102, and a plurality of client sub-systems, also referred to as client systems 104, connected to host computing device 102. In one embodiment, client systems 104 are computers including a web browser, such that host computing device 102 is accessible to client systems 104 using the Internet. Client systems 104 are interconnected to the Internet through many interfaces including a network, such as a local area network (LAN) or a wide area network (WAN), dial-in-connections, cable modems and special high-speed ISDN lines. Client systems 104 could be any device capable of interconnecting to the Internet including a web-based phone, personal digital assistant (PDA), or other web-based connectable equipment. In some embodiments, host computing device 102 is configured to provide a web interface accessible by client systems 104 for requesting and accessing reports as described herein.

System 100 further includes a database 106 storing information on a variety of matters, as described below in greater detail. In one embodiment, database 106 is stored on host computing device 102 and can be accessed by potential users at one of client systems 104 by logging onto host computing device 102 through one of client systems 104. In an alternative embodiment, database 106 is stored remotely from host computing device 102 and may be non-centralized.

As described below, in the example embodiment, database 106 stores data received, retrieved, collected, or otherwise generated by host computing device 102. For example, host computing device 102 may store transaction data and other types of financial data from a payment network as described below. In another example, the data may be associated with medical records and other medical data. In certain embodiments, database 106 stores multiple types of data.

In the example embodiment, host computing device 102 is communicatively coupled to an access data analyzer 108. As used herein, host computing device 102 and access data analyzer 108 may be referred to collectively as an access data analytics system. In some embodiments, host computing device 102 and access data analyzer 108 are the same device. In other embodiments, host computing device 102 and access data analyzer 108 are separate devices. The functions described herein of host computing device 102 and access data analyzer 108 are not limited to either device and may be performed by either host computing device 102 or access data analyzer 108.

Host computing device 102 is further configured to use the collected data to generate reports for the client and review report assessments for the host. Host computing device 102 is configured to receive report queries from client systems 104 to generate one or more reports based on the stored data. The report queries include one or more parameters that define or specify a portion of the stored data to be included in the requested reports and settings of the reports. The parameters may include, but are not limited to, languages, report content (i.e., what stored data is included in the report), data fields or elements, access levels, a report schedule, and format settings. The access levels facilitate selective access for the reports and, in some embodiments, to particular portions of a report. For example, an executive may have a higher access level than an entry-level employee, and therefore has an access level that enables the executive to view more reports than the employee. The report schedule is a recurring time interval for updating the report or generating a new report based on the report query automatically. In one example, reports including payment transaction data may be generated on a monthly or weekly basis for review. For recurring reports, the parameters may be selectively updated or changed.

Based upon the received parameters, host computing device 102 retrieves the stored data associated with the report query to generate one or more reports. The reports are stored in a memory associated with host computing device 102 (e.g., database 106). In the example embodiment, the parameters are stored with the report for subsequent analysis. In other embodiments, the parameters are stored elsewhere, such as at access data analyzer 108. A log file documenting previous parameters, related reports, and other information for each report or report query may also be generated and stored with the reports.

Once the reports have been generated, host computing device 102 enables one or more client systems 104 to access the reports. In at least some embodiments, when client system 104 attempts to access a report, host computing device 102 transmits a copy of the report to client system 104. Host computing device 102 may provide the reports via a web interface. Each user of client systems 104 may be associated with a user profile including information about the user, such as the user's access level, preferred language, and other information.

When a report generated by host computing device 102 is accessed, host computing device 102 and/or access data analyzer 108 (collectively referred to as access data analytics system) collects or generates metadata (also referred to herein as "access profile data") related to the access. For example, the metadata may include an access level of the user, a language of the report accessed, a timestamp of the access, and duration of the access. In at least some embodiments, the user profile of the user accessing the report is retrieved by host computing device 102 and/or access data analyzer 108 to generate the access profile data. The access profile data is stored with the accessed report for analysis. In other embodiments, the access profile data is stored elsewhere, such as at access data analyzer 108. Access profile data is collected and stored for each access attempt of the reports.

In the example embodiment, access data analyzer 108 is configured to receive an access analytics data request from a requestor. The requestor may be a user of client system 104 or another user, such as an administrative user associated with access data analyzer 108. In some embodiments, the access analytics data request is a recurring request with a predefined frequency (e.g., monthly, yearly, etc.). The access analytics data request is configured to request information associated with access to the reports. Access data analyzer 108 is configured to retrieve the stored access profile data for each report associated with the access analytics data request and the parameters of the reports. The access profile data and the parameters are added to an access analysis table 110. In the example embodiment, access analysis table 110 is stored at access data analyzer 108. In other embodiments, access analysis table 110 is stored elsewhere, such as at host computing device 102 or database 106. Access analysis table 110 includes access analytics data associated with the reports. In some embodiments, access analysis table 110 may be generated for each access analytics data request. In other embodiments, access analysis table 110 may include access analytics data for each report generated by host computing device 110. In such embodiments, the access analytics data for each report may include a query identifier to indicate which report query is associated with the report. Although access analysis table 110 is described as generated in response to an access analytics data request, it is to be understood that access analysis table 110 may be generated prior the request. Access data analyzer 108 may update access analysis table 110 continuously, periodically, or asynchronously (e.g., in response to the access analytics data request). The access analytics data may be aggregated or otherwise derived from the access profile data and the parameters. Access analysis table 110 is configured to provide access analytics data for each report individually or for a set of reports.

In some embodiments, access data analyzer 108 is configured to identify and tag reports that are potentially inactive. As used herein, a report is inactive if the report has not been accessed within a predetermined period of time. For example, if twenty reports are created providing the same data in different languages, access data analyzer 108 may identify seven of the reports that have not been accessed since the reports have been generated. In some embodiments, the report may be determined to be inactive if the report has been accessed a number of times below a predetermined threshold within the period of time. Tagged reports are identifiable from the access analytics data associated with the tagged reports in access analysis table 110. In certain embodiments, access data analyzer 108 may be configured to identify and tag reports that exhibit other trends or characteristics. For example, access data analyzer 108 may tag reports that are frequently accessed.

In at least some embodiments, access data analyzer 108 is configured to automatically remove inactive reports and/or revoke user access to a report based on the generated access analytics data, thereby reducing the computer resources allocated for generating and storing present and/or future reports. In one embodiment, access data analyzer 108 compares the access analytics data of the access analysis table to at least one predetermined access threshold that represents report access activity (i.e., number of unique accesses over a period of time) to identify an inactive report or a report with a relatively low number of accesses. These identified reports may be automatically deleted or tagged as inactive. In the future, for reports that are deleted or tagged as inactive, system 100 would override the instructions to generate these reports by access data analyzer 108 sending a message to host computing device 102 instructing it to no longer generate the reports that are deemed inactive. In some embodiments, access data analyzer 108 compares access profile data for each user permitted to access a report to a predetermined user threshold to identify inactive users. Based on the comparison, the access data analyzer may identify users that have not accessed the report in a predetermined period of time. The access data analyzer may be configured to automatically revoke a user's access to the report if the user is identified as inactive. Access data analyzer 108 may be configured to send instructions to host computing device 102 to update access rules stored in host computing device 102 to prevent inactive users from accessing the report. More specifically, the access rules are updated to remove the inactive users' permission to view, edit, or otherwise retrieve the report.

Access data analyzer 108 is configured to provide an extract of access analysis table 110 to the requestor associated with the access analytics data request. The extract includes at least a portion of the access analytics data within access analysis table 110. In some embodiments, access data analyzer 108 may enable the requestor to select what data is included in the extract. For example, one requestor may only want frequency data related to one or more reports, whereas a second requestor may want the frequency data in addition to business group data. In some embodiments, the requestor may request the extract on-behalf of another party, such as the client that submitted the report query. In the example embodiment, access data analyzer 108 is configured to generate one or more access review items based on the access analytics data requested by the access analytics data request. The access review items may include, but are not limited to, a spreadsheet, a chart, a graph, and a table. The requestor can review the extract to determine if existing or subsequent reports should be adjusted. For example, the requestor may determine that reports in a particular language or including particular data are not being accessed and therefore do not need to be generated going forward.

Figure 2:
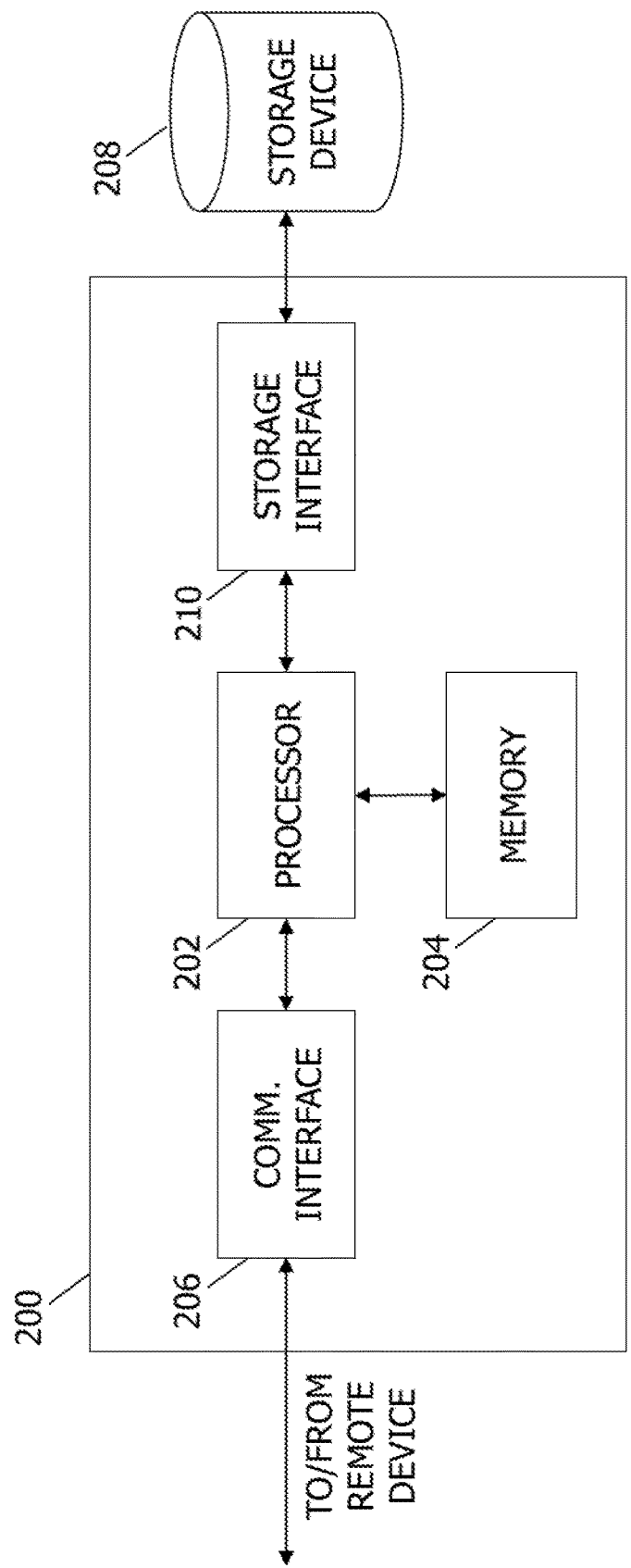
FIG. 2 illustrates an example configuration of a host system for use with the access data analytics system shown in FIG. 1.

FIG. 2 illustrates an example configuration of a host system 200. Host system 200 may include, but is not limited to, host computing device 102, client systems 104, and/or access data analyzer 108 (all shown in FIG. 1). It is to be understood that host system 200 may include additional, fewer, or alternative components, including those described elsewhere herein.

Host system 200 includes a processor 202 for executing instructions. Instructions may be stored in a memory area 204, for example. Processor 202 may include one or more processing units (e.g., in a multi-core configuration) for executing instructions. The instructions may be executed within a variety of different operating systems on the host system 200, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 202 is operatively coupled to a communication interface 206 such that host system 200 is capable of communicating with a remote device such as a user system or another host system 200. For example, communication interface 206 may receive authorization request messages from interchange network 108 via the Internet, as illustrated in FIG. 1.

Processor 202 may also be operatively coupled to a storage device 208. Storage device 208 is any computer-operated hardware suitable for storing and/or retrieving data. In some embodiments, storage device 208 is integrated in host system 200. For example, host system 200 may include one or more hard disk drives as storage device 208. In other embodiments, storage device 208 is external to host system 200 and may be accessed by a plurality of host systems 200. For example, storage device 208 may include multiple storage units such as hard disks or solid state disks in a redundant array of inexpensive disks (RAID) configuration. Storage device 208 may include a storage area network (SAN) and/or a network attached storage (NAS) system.

In some embodiments, processor 202 is operatively coupled to storage device 208 via a storage interface 210. Storage interface 210 is any component capable of providing processor 202 with access to storage device 208. Storage interface 210 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 202 with access to storage device 208.

Memory area 204 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 3:
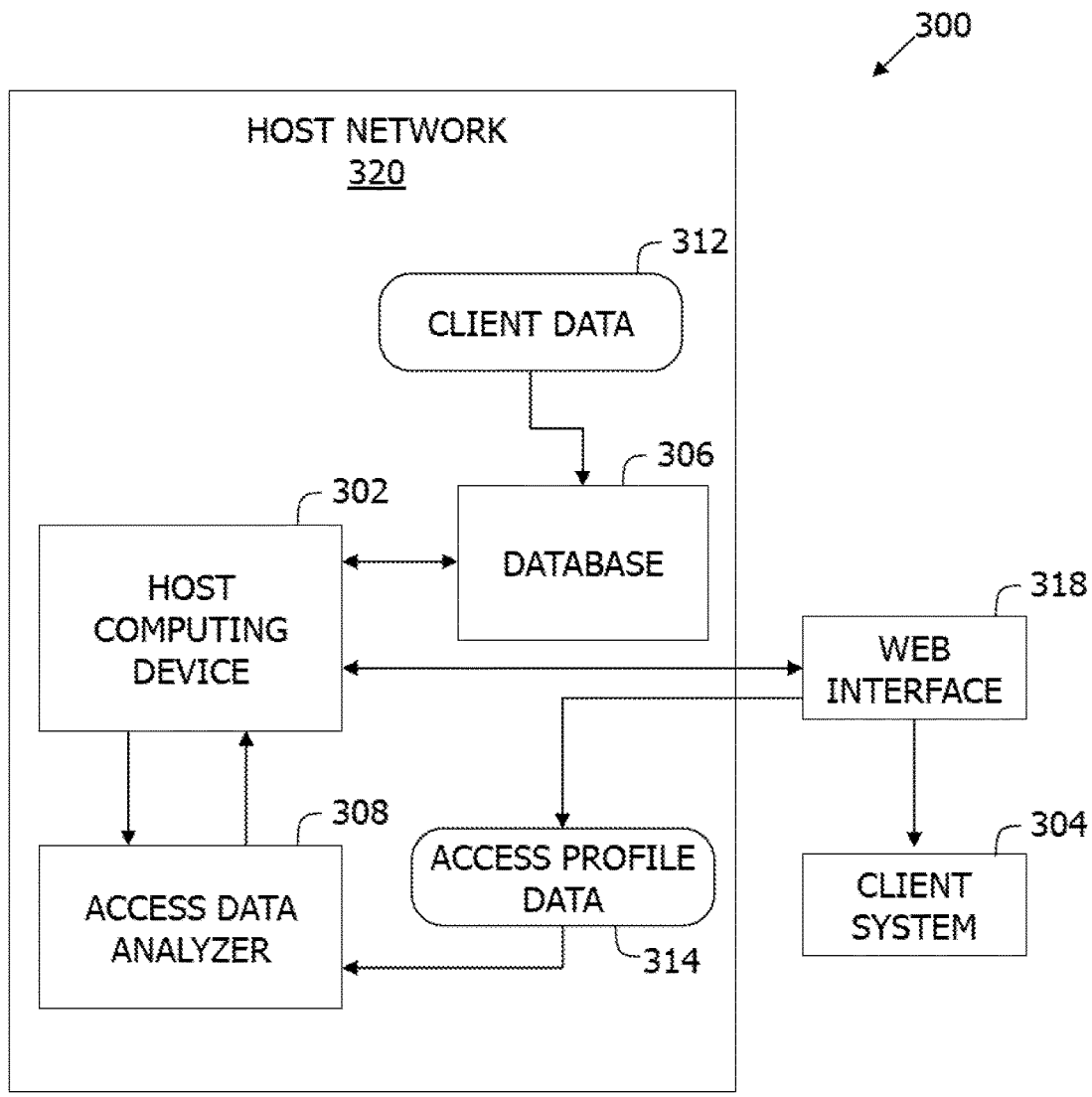
FIG. 3 is a data flow block diagram of the access data analytics system shown in FIG. 1.

FIG. 3 depicts data flow block diagram illustrating an example data flow of an access data analytics system 300. More specifically, the data flow block diagram of the access data analytics system 300 illustrates generating reports and access analytics data based on client data 312 and access data 314 of a client. System 300 is similar to system 100 (shown in FIG. 1) and, in the absence of contrary representation, includes similar components and functionality. In the example embodiment, system 300 includes a host computing device 302, one or more client systems 304, a database 306, an access data analyzer 308, a web interface 316, and a host network 320.

In the example embodiment, host network 320 includes host computing device 302, database 306, and access data analyzer 308. Client data 312 is data collected by host computing device 302 from the client or another data source. For example, client data 318 may be transaction data collected during payment processing or medical records collected from a hospital. Client data 318 may include the type of service requested or used by the client from host computing device 302, the cost of the service requested by the client, or the location of the service requested by the client. For example, if host computing device 302 is associated with a credit card company and the client is a bank, client data 312 may include transactions by the bank's cardholders, the amount of the bank's cardholder's transaction, or the location of the merchant where the bank's cardholder's transaction takes place.

In the example embodiment, the client transmits a report query from client system 304 to host computing device 302 to generate one or more reports associated with client data 312. The report query includes one or more parameters to define and identify the data of client data 312 to be included within the reports. Host computing device 302 receives or retrieves at least a portion of client data 312 based on the report query. Host computing device 302 is configured to generate reports based on the retrieved portion of client data 312. For example, if the client requests the average cost of service, the most frequented location of service, data from September to December, and data from December to March in English, host computing device 302 generates a report in English showing the average cost of service and the most frequented location of service from September to December and shows the average cost of service and the most frequented location of service from December to March.

In the example embodiment, host computing device 302 is configured to store the generated reports. In other embodiments, the reports may be stored at a different location, such as a different device within host network 320. To access the reports, the client accesses web interface 318 using client system 304. In the example embodiment, client system 304 provides user credentials (e.g., username and password) to web interface 318 to log-on. When the user is logged-on, a user profile of the user may be retrieved. The user profile includes information associated with the user, such as access level, preferred language, job title, etc. Host computing device 302 may store the user profiles. In other embodiments, the user profile is provided by client system 304.

Web interface 318 is configured to provide client system 302 with a list including at least a portion of the generated reports. In some embodiments, client system 302 may not be provided reports that require an access level exceeded the access level of the user. Web interface 318 is configured to enable the user to search, filter, or otherwise navigate the reports.

When the user selects a report to access, host computing device 302 and/or access data analyzer 308 is configured to generate and/or collect access profile data 314 associated with the access attempt. Access profile data 314 is collected while the user is logging on host network 320 and while the user accessing the reports. Access profile data 314 is metadata associated with a user that may include a user ID, a user access level, the client associated with the user, or a language of the accessed report. Host computing device 302 or access data analyzer 308 may send this data to database 306 for storage with the reports. In some embodiments, access data analyzer 308 may store access profile data 314 in an access analysis table (not shown).

In the example embodiment, access data analyzer 308 receives an access analytics data request associated with one or more reports stored in host network 320. The request may be received from client system 304 or a user associated with host network 320. Access data analyzer 308 is configured to retrieve access profile data 314 associated with the reports identified in the request. In particular, access data analyzer 308 retrieves, identifies, or otherwise calculates access analytics data from access profile data 314. An extract of the access analysis table including at least a portion of the access analytics data is provided to client system 304 for review and to determine if any reports generated for the client are inactive. In some embodiments, access data analyzer 308 transmits the extract to client system 304. In another embodiment, the access analytics data may be stored within host network 320 and web interface 318 provides client system 304 an option to view and/or download the access analytics data.

Figure 4:
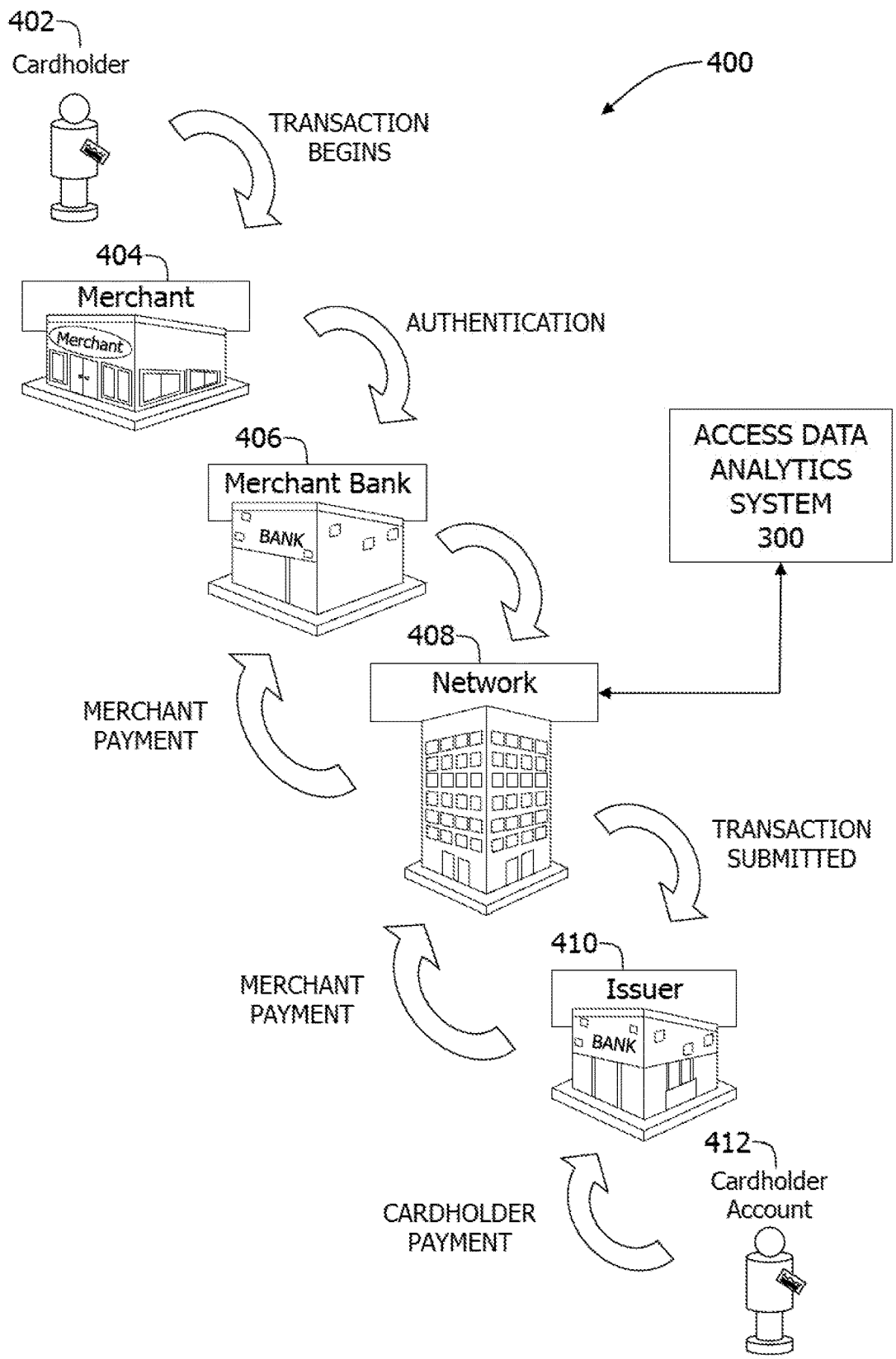
FIG. 4 is a schematic diagram illustrating an example multi-party payment card industry system that provides data to the access data analytics system shown in FIG. 1.

FIG. 4 is a schematic diagram illustrating access data analytics system 300 (shown in FIG. 3) within a multi-party payment card industry system 400 for collecting client data to generate reports. Although access data analytics system 300 is shown in communication with system 400, it is to be understood that at least a portion of access data analytics system 300 may be integrated into system 400. For example, host computing device 302 (shown in FIG. 3) may be included in an interchange network 408 to receive transaction data and process transactions. Example embodiments described herein may relate to transaction card system as an example host system, such as a credit card payment system using the MasterCard® interchange network. The MasterCard® interchange network is a proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 402, who uses the transaction card to tender payment for a purchase from a merchant 404. To accept payment with the transaction card, merchant 404 must normally establish an account with a financial institution that is part of the financial payment system. This financial institution is usually called the "merchant bank," the "acquiring bank," or the "acquirer." When cardholder 402 tenders payment for a purchase with a transaction card, merchant 404 requests authorization from a merchant bank 406 for the amount of the purchase. The request may be performed over the telephone, but is usually performed through the use of a point-of-sale terminal, which reads cardholder's 402 account information from a magnetic stripe, a chip, or embossed characters on the transaction card and communicates electronically with the transaction processing computers of merchant bank 406. Alternatively, merchant bank 106 may authorize a third party to perform transaction processing on its behalf. In this case, the point-of-sale terminal will be configured to communicate with the third party. Such a third party is usually called a "merchant processor," an "acquiring processor," or a "third party processor."

Using interchange network 408, computers of merchant bank 406 or merchant processor will communicate with computers of an issuer bank 410 to determine whether cardholder account 412 is in good standing and whether the purchase is covered by cardholder's 402 available credit line. Based on these determinations, the request for authorization will be declined or accepted. If the request is accepted, an authorization code is issued to merchant 404.

When a request for authorization is accepted, the available credit line of cardholder account 412 is decreased. Normally, a charge for a payment card transaction is not posted immediately to cardholder account 412 because bankcard associations, such as MasterCard International Incorporated®, have promulgated rules that do not allow merchant 404 to charge, or "capture," a transaction until goods are shipped or services are delivered. However, with respect to at least some debit card transactions, a charge may be posted at the time of the transaction. When merchant 404 ships or delivers the goods or services, merchant 404 captures the transaction by, for example, appropriate data entry procedures on the point-of-sale terminal. This may include bundling of approved transactions daily for standard retail purchases. If cardholder 402 cancels a transaction before it is captured, a "void" is generated. If cardholder 402 returns goods after the transaction has been captured, a "credit" is generated. Interchange network 408 and/or issuer bank 410 stores the transaction card information, such as a type of merchant, amount of purchase, date of purchase, in a database (e.g., database 106, shown in FIG. 1).

After a purchase has been made, a clearing process occurs to transfer additional transaction data related to the purchase among the parties to the transaction, such as merchant bank 406, interchange network 408, and issuer bank 410. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 404, merchant bank 406, and issuer bank 410. Settlement refers to the transfer of financial data or funds among merchant's 404 account, merchant bank 406, and issuer bank 410 related to the transaction. Usually, transactions are captured and accumulated into a "batch," which is settled as a group. More specifically, a transaction is typically settled between issuer bank 410 and interchange network 408, and then between interchange network 408 and merchant bank 406, and then between merchant bank 406 and merchant 404.

In the example embodiment, the multi-party payment card industry system 400 includes access data analytics system 300 that is in communication with interchange network 408 (also referred to as host network). System 300 is configured to (i) collect data from system 400, (ii) generate reports based on the data collected from the client wherein the client chooses which types of data may be included in the report, (iii) display the requested report to the client user, (iv) collect access profile data from client user's accessing the reports, (v) generate access analytics data in response to an access analytics data request and/or (vi) display the requested access analytics data to the requestor.

Figure 5:
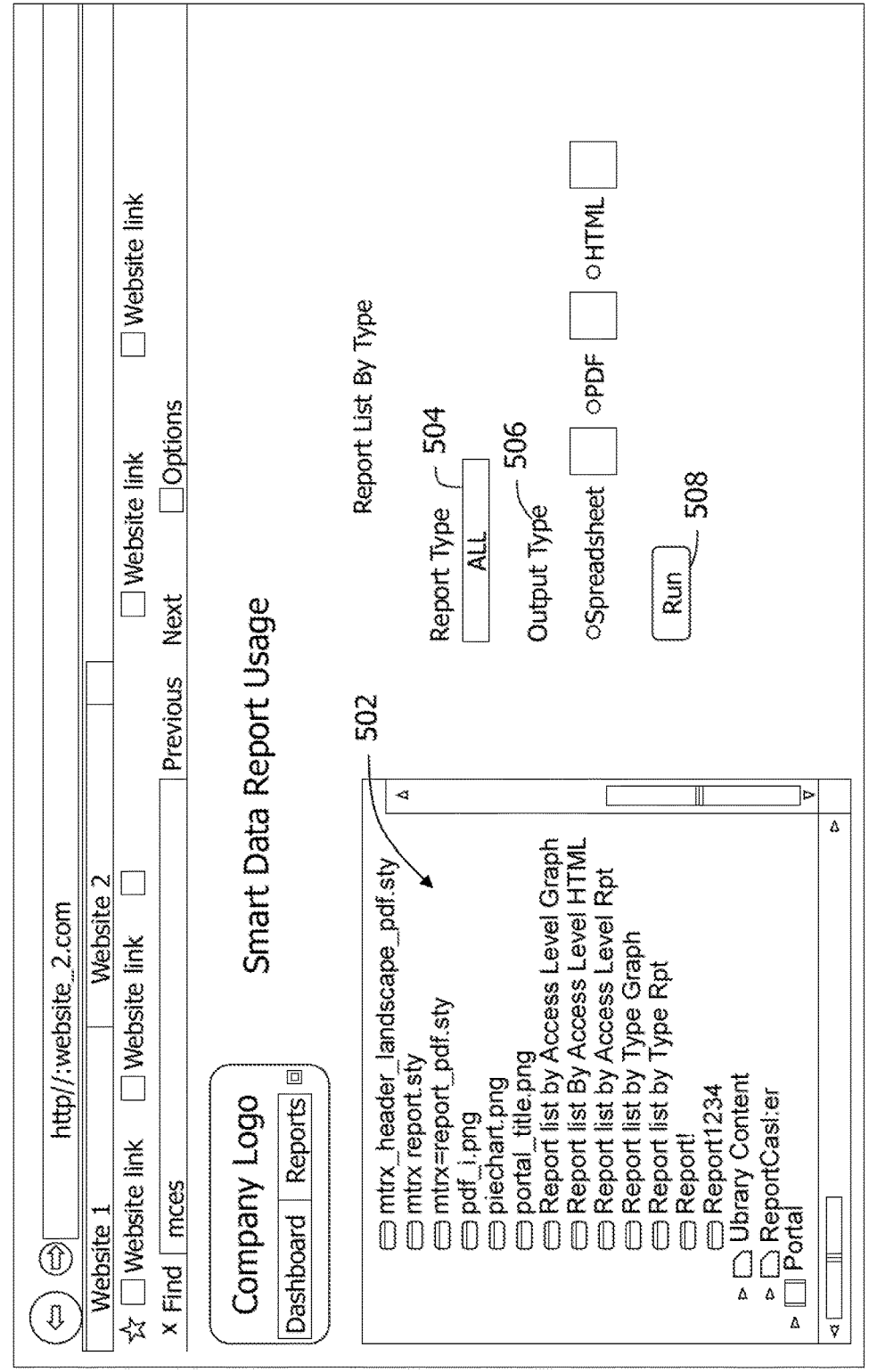
FIG. 5 is an example launch page of a web interface for generating an access analytics data request for the system shown in FIG. 1.

FIG. 5 is an example launch page 500 for requesting access analytics data using system 100 (shown in FIG. 1). The launch page 500 includes (a) options 502, (b) report type selection 504, (c) output type selection 506, and (d) a run button 508. In one embodiment, launch page 500 is provided to a user accessing with host network 320 (shown in FIG. 3) when the user enters the environment for generating reports. Launch page 500 provides the user with an assortment of options 502 for identifying what access analytics data to request and for which reports. These options 502 include access level, type of report generated, and a particular client user. After the user has selected his or her options 502, launch page 500 prompts the user to pick a report type 504. As used herein, a report type refers to a particular information format (charts, graphs, models, etc.) or analytic model used to generate the report. The user may then select the output type 506 he or she prefers. For example, the output types 506 to choose from may include excel, portable document format (PDF), or hypertext markup language (HTML). The user selects one of these then clicks the "run" button 508. Once the run button is clicked, an access analytics data request is generated and transmitted to host computing device 102 and/or access data analyzer 108 (both shown in FIG. 1).

FIGS. 6-13 are example screenshots displayed as part of system 100 (shown in FIG. 1). These example screenshots depict exemplary graphs and charts including access analytics data from access data analytics system 100. The graphs and charts are provided to a requestor in response to an access analytics data request transmitted to system 100. In at least some embodiments, the graphs and charts are viewable via a web interface of system 100. System 100 enables the requestor to view and store the access analytics data in various formats and combinations to facilitate review of the access analytics data and subsequent action, such as reducing the number of client users or the number of generated reports. It is to be understood that the graphs and charts shown in FIGS. 6-13 are for exemplary purposes only, and the access analytics data provided by system 100 is not limited to the particular formats, information, and/or configurations illustrated.

Figure 6:
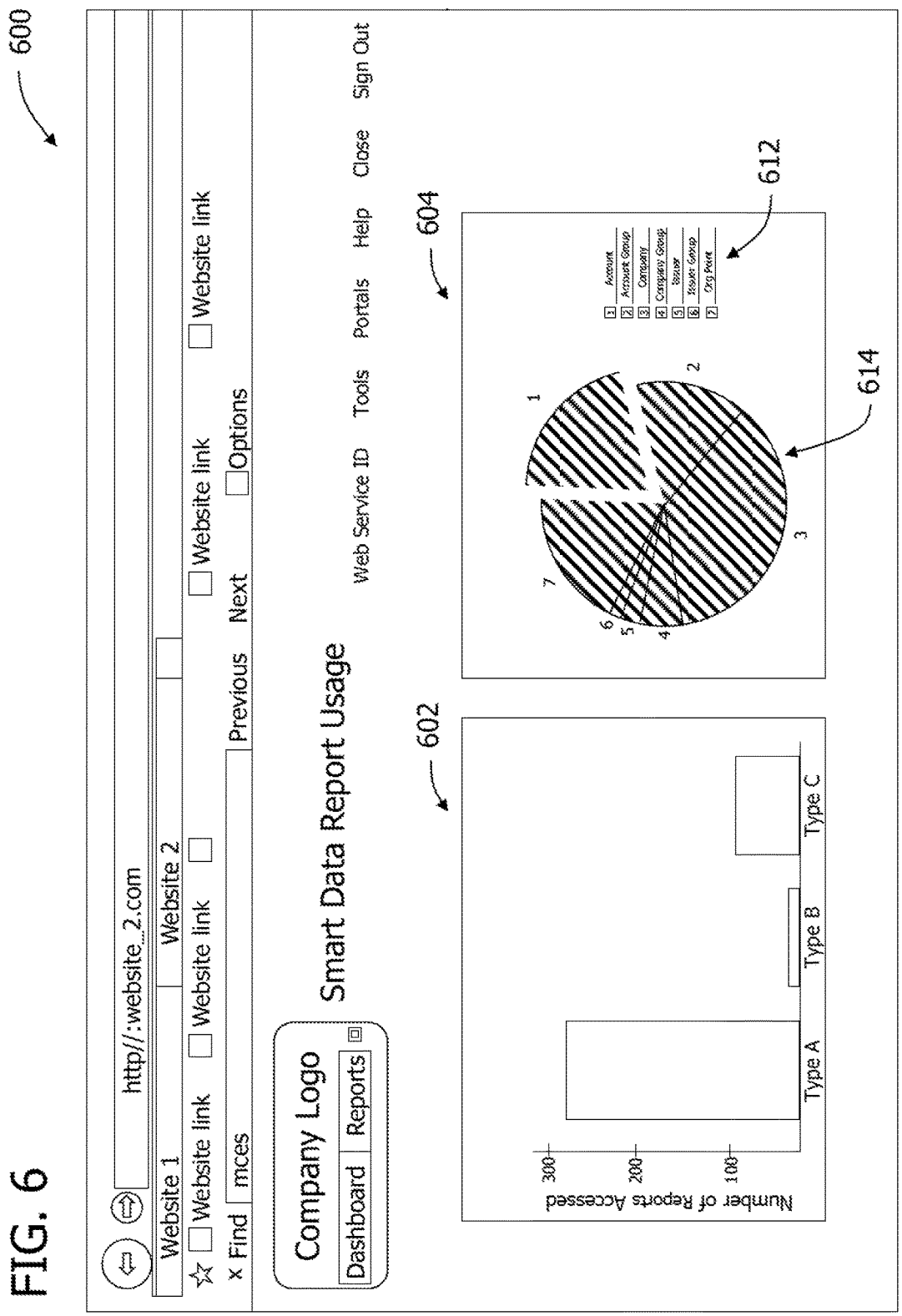
FIG. 6 is an example screenshot of a graph provided by the system shown in FIG. 1 in response to an access analytics data request that depicts the number of reports generated by type of report and access level.

FIG. 6 is an example screenshot 600 showing access analytics data associated with a client from system 100. Screenshot 600 may be provided to the requestor by access data analytics system 100 in response to an access analytics data request. More specifically, screenshot 600 illustrates the number of reports generated by type of report and for determining the percent of total reports being generated by a particular access level. Screenshot 600 includes (a) a report type graph 602 and (b) an access level graph 604. Report type graph 602 is a bar graph that depicts the number of reports generated based on report type. Report type graph 602 includes three report types Type A, Type B, and Type C. For each of the three example report types shown, the number of reports generated using the report type is depicted as a bar. For example, Type A produces a relatively high amount of reports with 282 reports generated, whereas Type B produces a relatively low amount of reports with 3 reports generated. The user or requestor that requested the access analytics data may advise the client based on screenshot 600 that the Type B report type is not cost effective and the client may want to remove that option to lower cost.

The access level graph 604 is a pie graph including (a) access levels 612 and (b) access percentages 614. The access level graph 604 shown here displays, in a pie graph format, the percentages 614 of each access level 612 accessing the reports out of the total number of generated reports. The access levels 612 indicate a particular business group that has permission to access and/or generate reports. The access levels 612 with higher percentages 614 are accessing the reports more frequently relative to other access levels 612. For example, as shown in access percentages 614, an Account Group access level 612 has a 22% of the reports accessed from system 100, while an Issuer Group access level 612 has a 1% relative access percentage 614. The user requesting the access analytics data may use these percentages 614 to advise the client on which access levels 612 to cut from subsequent or recurring report requests. Although report type graph 602 and access level graph 604 are shown as a bar graph and a pie graph, respectively, it is to be understood that the access analytics data in report type graph 602 and access level graph 604 may be presented in a different graphical format.

Figure 7:
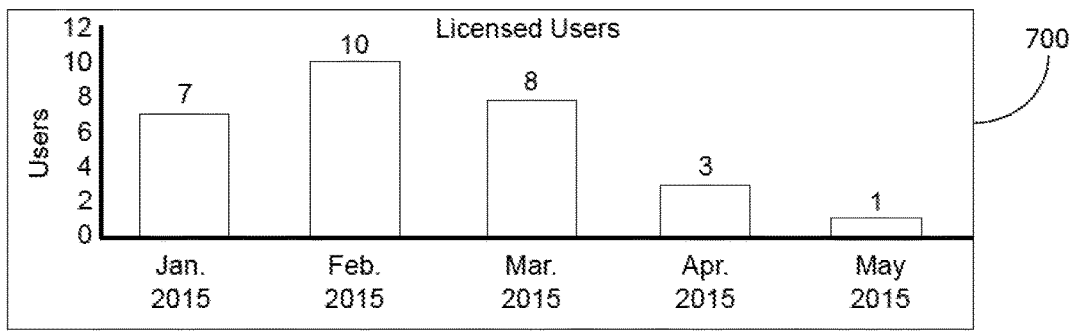
FIG. 7 is an example screenshot of a user graph including access analytics data generated by the system shown in FIG. 1.

FIG. 7 is an example screenshot 700 of a user graph including access analytics data generated by access data analytics system 100. In the example embodiment, the user graph is a bar graph depicting the number of users licensed to generate a report for a predetermined period of time. In the example embodiment, the predetermined time period is separated into months. The user graph enables a requestor to divide the number of reports generated by the number of users licensed to generate such reports. For example, in January 2015, there were seven users licensed to generate reports, whereas in February 2015, there were ten users licensed to generate reports.

Figure 8:
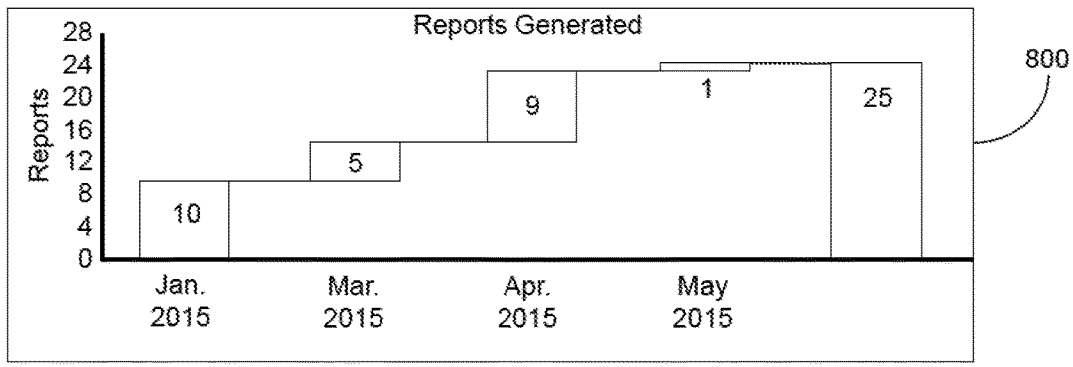
FIG. 8 is an example screenshot of a reports generated graph including access analytics data generated by the system shown in FIG. 1.

FIG. 8 is an example screenshot 800 of a reports generated graph including access analytics data generated by access data analytics system 100. The reports generated graph is a bar graph showing the number of reports ran over a predetermined period of time. In the example embodiment, the reports generated graph includes a number of reports generated over a plurality of months. Each month includes a number of reports generated within that month. The graph also shows the total number of reports generated over all of the months. In one example, ten reports where generated in the month of January 2015, whereas only one report was generated in the month of May 2015. This may indicate to a requesting user that the client has busy months and slow months for report generation.

Figure 9:
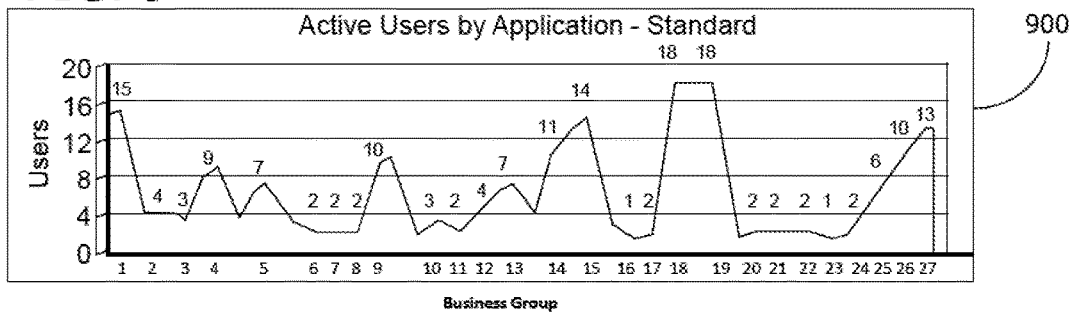
FIG. 9 is an example screenshot of a business group usage graph including access analytics data generated by the system shown in FIG. 1.

FIG. 9 is an example screenshot 900 of a business group usage graph including access analytics data generated by access data analytics system 100. In the example embodiment, the business group usage graph is a line graph showing the number of users accessing reports for each business group over a predetermined period of time. As used herein, a business group is a division or group within a client. The business groups may include, for example, accounting, marketing, research development, etc. Each number shown in the business group usage graph may represent a different business group or sub-business group. For example, an Audit Report business group has nine users that have accessed a report in the graph during the predetermined period of time. This access analytics data facilitates the requestor identifying how the business groups of a client compare with each other with respect to a number of users utilizing the report generation.

Figure 10:
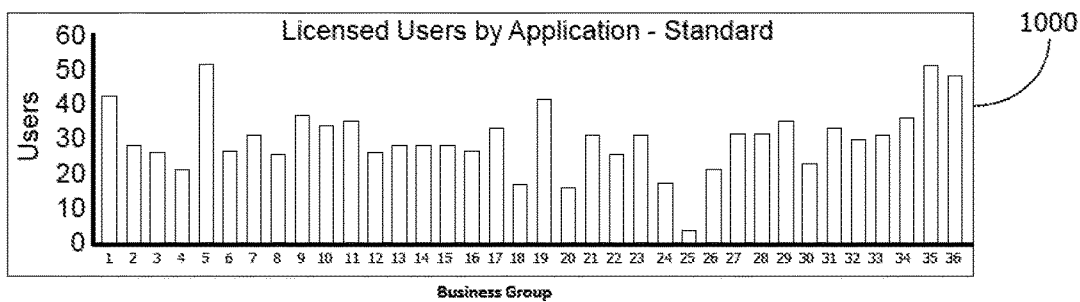
FIG. 10 is an example screenshot of a business group user access graph including access analytics data from the system shown in FIG. 1.

FIG. 10 is an example screenshot 1000 of a business group user access graph including access analytics data from system 100. The business group user access graph is a bar graph depicting the number of users with permission to access the reports for each business group. This facilitates comparison between the number of users within a business group and the active number of user that access reports within a business group. In one example, comparing the access analytics data in the business group usage graph shown in FIG. 9 to the access analytics data in the business group user access graph may facilitate determining a percentage of licensed users that actually access the reports. The requestor would be able to determine the business groups where there is a high rate of access within the group and where there is a low rate of access within the group. For business groups with a low access percentage, the requestor may recommend to the client to remove or reduce access permissions from those business groups.

For example, the Audit Report business group has fifty-four users with access to the reports. Nine users have accessed a report within the predetermined period of time, which means that approximately 17% of the Audit Report business group actively accesses reports. With respect to the business group usage graph, nine users may appear to be a high to average level of access when compared to the other business groups. However, when compared to the business group user access graph, it is apparent that the Audit Report business group has a low level of usage because only nine of the fifty-four users are accessing reports.

Figure 11:
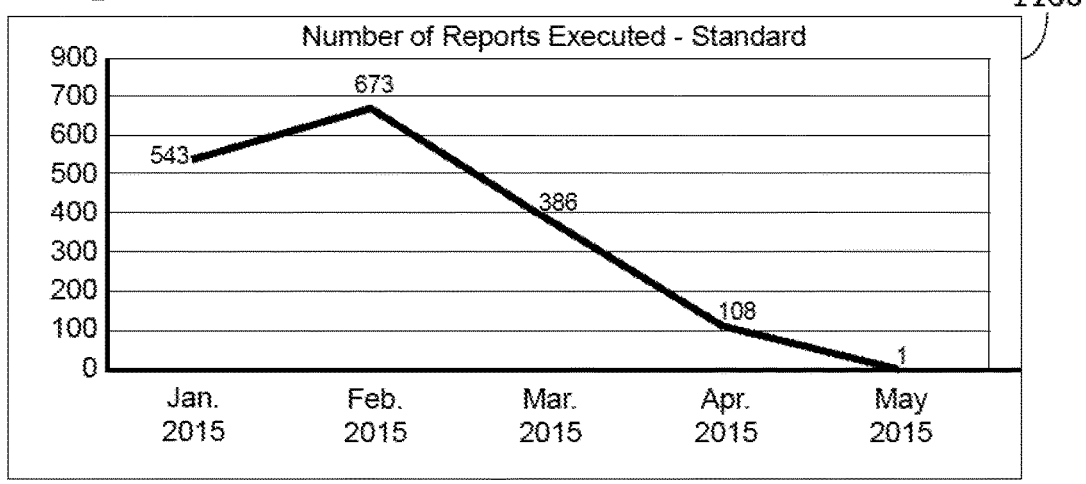
FIG. 11 is an example screenshot of a reports generated graph including access analytics data from the system shown in FIG. 1.

FIG. 11 is an example screenshot 1100 of a reports generated graph including access analytics data showing the number of reports generated over a plurality of months. The reports generated graph is displayed here as a line graph. The number of reports generated over each month is shown in the reports generated graph. For example, 673 reports were generated in February 2015, whereas only one report was generated in the month May 2015. This may indicate to requestor that the client was generating more reports in the past but is not generating as many reports currently.

Figure 12:
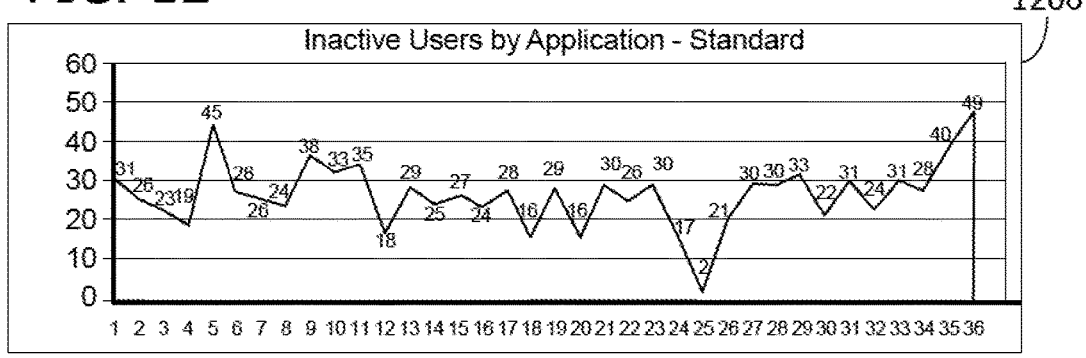
FIG. 12 is an example screenshot of an inactive users graph that includes access analytics data from the system shown in FIG. 1.

FIG. 12 is an example screenshot 1200 of an inactive users graph that includes access analytics data from system 100 that depicts the number of client users with access that have not generated a report within a particular business group during a predetermined period of time. These users may be identified as 'inactive users'. The inactive users graph includes a number of inactive users for each business group. In one example, within a Legal business group, only two users have generated a report. This may indicate to the requestor that the Legal business group is not using system 100 (shown in FIG. 1). The client may remove access and/or report generation capabilities from users associated with the Legal client business group in response.

Figure 13:
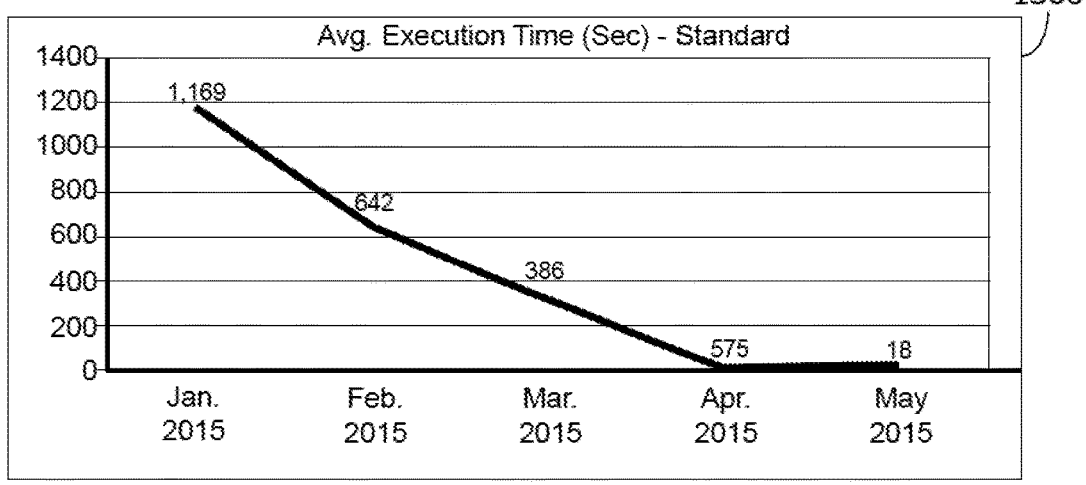
FIG. 13 is an example screenshot of an average execution time graph that includes access analytics data from the system shown in FIG. 1.

FIG. 13 is an example screenshot 1300 of an average execution time graph that shows the average time to generate a report over a period of time. The average execution time graph is displayed here as a line graph. For each month, the graph indicates the average amount of time it takes to generate a report for that month. For example, in January 2015, it took an average time of 1,169 second to generate a report. In May 2015, it took an average time of 108 seconds to generate a report. The increased performance may indicate that the bandwidth of system 100 or another characteristic of system 100 may have improved in May 2015. For example, if the client has adjusted their report queries based on the access analytics data received from system 100, the reduced time to generate a report may be a result.

FIG. 14 is an example report type list 1400 includes access analytics data from system 100 (shown in FIG. 1). In the example embodiment, list 1400 is generated and transmitted by system 100 in response to an access analytics data request. Report type list 1400 shows the report type of the reports generated by the client. The report type list 1400 includes (a) report types 1402, (b) report names 1404, and (c) report creation dates 1406. This report type list 1400 is generally provided within a spreadsheet, enabling requestor to manipulate and preform calculations on the list 1400 once it is provided to the requestor. This report type list 1400 enables the requestor to read in a user friendly format the types of reports being generated and when the reports are being generated. List 1400 also facilitates access to this data in a searchable format. The report type list 1400 enables the requestor to understand the client's use of system 100 (shown in FIG. 1) to generate reports.

FIG. 15 is an example access level list 1500 generated from access analytics data that depicts reports based on the access levels of reports generated. In the example embodiment, each entry in list 1500 represents a report generated by system 100 (shown in FIG. 1). The list 1500 may be filtered according to access level such that a subset of entries are shown within list 1500. The access level list 1500 is typically provided in a spreadsheet format enabling the requestor to manipulate and perform calculations on the access level list 1500. The access level list 1500 enables the requestor to view the data based on access level 1502. In the example embodiment, the requestor is provided list 1500 is a readable and searchable format.

Figure 16:
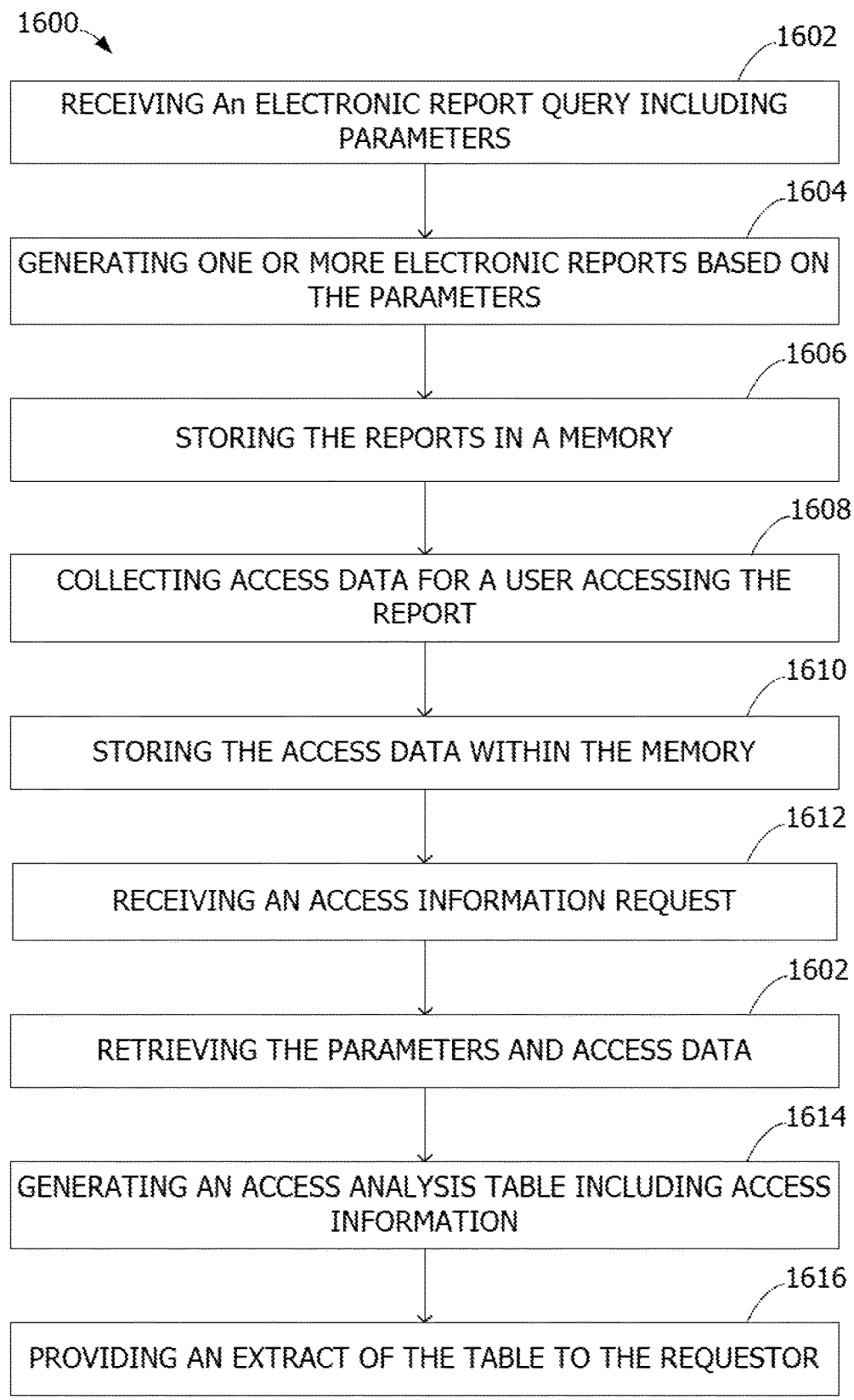
FIG. 16 is a flow diagram of an example computer-implemented method for providing access analytics data associated with one or more reports using the system shown in FIG. 1.

FIG. 16 is a flow diagram of an example computer-implemented method 1600 for providing access analytics data associated with one or more reports using system 100 (shown in FIG. 1). Method 1600 may be performed by a host computing device and/or an access data analyzer. In some embodiments, method 1600 may include additional, fewer, or alternative steps, including those described elsewhere herein.

Method 1600 begins with the host computing device receiving 1602 an electronic report query from a client system to generate one or more reports. The report query includes one or more parameters for defining the reports. The host computing device generates 1604 the electronic reports based on the parameters and stores 1606 the reports in a memory associated with the host computing device. In some embodiments, the reports are generated from stored data associated with the client that transmitted the report query. Client users with permission to view the reports access the reports through a web interface in communication with the host computing device.

The access data analyzer collects 1608 the access profile data for a user accessing the reports and stores 1610 the access profile data within the memory. The access profile data includes metadata associated with the user. The access data analyzer receives 1612 an access analytics data request from a requestor associated with the access data analyzer or with the client of the reports. The access data analyzer retrieves 1614 the parameters and the access profile data of the reports identified in the access analytics data request and generates 1616 an access analysis table based on the retrieved parameters and access profile data. The access analysis table includes access analytics data associated with the access report query. The access data analyzer then provides 1618 an extract of the table that includes at least a portion of the access analytics data within the access analysis table to the requestor for review. In at least some embodiments, the requestor may specify in the access analytics data request what data is to be provided 1618 in the extract.

In certain embodiments, the access data analyzer may be configured to automatically delete inactive reports or prevent inactive reports from recurring. In one example, the access data analyzer compares the access analytics data of the access analysis table to a predetermined access threshold to identify inactive reports. In some embodiments, the access data analyzer may analyze the access analytics data and/or the collected access profile data to identify users that have not access a candidate report in a period of time (i.e., inactive users). In one embodiment, the access data analyzer compares the access analytics data and/or the access profile data associated with a particular user to a predetermined user threshold that represents user access activity. If the user's access activity does not meet or exceed the threshold, the access data analyzer may revoke the user's access to the report.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An access data analytics system comprising a processor and a memory in communication with the processor, wherein said processor is configured to:
   store an electronic report in the memory, the electronic report generated based on an electronic report query including a plurality of parameters;
   collect access profile data for a user accessing the electronic report, the access profile data including metadata associated with the user accessing the electronic report;
   store the access profile data within the memory;
   receive an access analytics data request requesting access analytics data associated with the stored electronic report;
   retrieve the stored access profile data;
   generate an access analysis table based at least in part on the retrieved access profile data, the access analysis table including the access analytics data associated with the stored electronic report; and
   provide an extract of the access analysis table to a requestor of the access analytics data request, the extract including at least a portion of the access analytics data associated with the stored electronic report,
   wherein the processor is further configured to: (i) provide a web interface to a client system associated with the user wherein the stored electronic report is accessible by the client system from the web interface and (ii) detect the client system accessing the stored electronic report; and wherein the processor is further configured to: (i) collect access profile data from a plurality of users permitted to access the stored electronic report, (ii) generate the access analysis table based in part on the collected access profile data of the plurality of users, (iii) identify at least one user of the plurality of users that has not accessed the stored electronic report based on the access analysis table, and (iv) revoke access to the stored electronic report for the identified at least one user.

2. The access data analytics system in accordance with claim 1, wherein the processor is further configured to:
   store the plurality of parameters within the memory;
   retrieve the plurality of parameters in response to the received access analytics data request; and
   generate the access analysis table based in part on the plurality of parameters.

3. The access data analytics system in accordance with claim 1, wherein the plurality of parameters include at least one of access level, language, report type, business group, time period, report schedule, and type of client data.

4. The access data analytics system in accordance with claim 1, wherein the processor is further configured to:
   retrieve a user profile associated with the user accessing the stored electronic report; and
   collect access profile data from the user profile.

5. The access data analytics system in accordance with claim 1, wherein the processor is further configured to receive the access analytics data request through the web interface.

6. The access data analytics system in accordance with claim 1, wherein the processor is further configured to:
   generate a plurality of electronic reports based on the plurality of parameters; and
   collect access profile data for each report of the plurality of electronic reports.

7. The access data analytics system in accordance with claim 6, wherein the processor is further configured to:
   receive an access analytics data request associated with the plurality of electronic reports;
   retrieve the collected access profile data of the plurality of electronic reports;
   generate the access analysis table based on the retrieved access profile data, the access analysis table including access analytics data associated with the plurality of electronic reports;
   analyze the access analysis table;
   identify a first report of the plurality of electronic reports that has not been accessed within a predetermined period of time; and
   tag the access analytics data associated with the first report as inactive.

8. The access data analytics system in accordance with claim 1, wherein the processor is further configured to:
   compare the access analysis table to a predetermined access threshold representing report access activity; and
   automatically delete the stored electronic report based on the comparison.

9. A method of providing access analytics data for reports, the method comprising:
   storing, by an access data analytics system, an electronic report in a memory associated with the access data analytics system, the electronic report generated based on an electronic report query including a plurality of parameters;

collecting, by the access data analytics system, access profile data for a user accessing the electronic report, the access profile data including metadata associated with the user accessing the electronic report;

storing the access profile data within the memory;

receiving, by the access data analytics system, an access analytics data request requesting access analytics data associated with the stored electronic report;

retrieving the stored access profile data;

generating, by the access data analytics system, an access analysis table based at least in part on the retrieved access profile data, the access analysis table including the access analytics data associated with the stored electronic report; and providing, by the access data analytics system, an extract of the access analysis table to a requestor of the access analytics data request, the extract including at least a portion of the access analytics data associated with the stored electronic report, wherein collecting access profile data further comprises: (i) providing, by the access data analytics system, a web interface to a client system associated with the user wherein the stored electronic report is accessible by the client system from the web interface and (ii) detecting the client system accessing the stored electronic report;

wherein generating the access analysis table further comprises: (i) collecting access profile data from a plurality of users permitted to access the stored electronic report, (ii) generating the access analysis table based in part on the collected access profile data of the plurality of users, (iii) identifying at least one user of the plurality of users that has not accessed the stored electronic report based on the access analysis table, and (iv) revoking access to the stored electronic report for the identified at least one user.

10. The method in accordance with claim 9, wherein storing the electronic report further comprises storing the plurality of parameters within the memory, wherein generating the access analysis table further comprises:

retrieving the plurality of parameters in response to the received access analytics data request; and generating, by the access data analytics system, the access analysis table based in part on the plurality of parameters.

11. The method in accordance with claim 9, wherein the plurality of parameters include at least one of access level, language, report type, business group, time period, report schedule, and type of client data.

12. The method in accordance with claim 9, wherein collecting access profile data further comprises:

retrieving a user profile associated with the user accessing the stored electronic report; and collecting access profile data from the user profile.

13. The method in accordance with claim 9, wherein receiving the access analytics data request further comprises receiving the access analytics data request through the web interface.

14. The method in accordance with claim 9, wherein generating the electronic report further comprises:

generating, by the access data analytics system, a plurality of electronic reports based on the plurality of parameters; and collect access profile data for each report of the plurality of electronic reports.

15. The method in accordance with claim 14, wherein the access analytics data request is associated with the plurality of electronic reports, and wherein generating the access analysis table further comprises:

retrieving the collected access profile data of the plurality of electronic reports;

generating, by the access data analytics system, the access analysis table based on the retrieved access profile data, the access analysis table including access analytics data associated with the plurality of electronic reports;

analyzing the access analysis table;

identifying a first report of the plurality of electronic reports that has not been accessed within a predetermined period of time; and tagging, by the access data analytics system, the access analytics data associated with the first report as inactive.

16. The method in accordance with claim 9 further comprising:

comparing the access analysis table to a predetermined access threshold representing report access activity; and automatically deleting the stored electronic report based on the comparison.

17. At least one non-transitory computer-readable storage media having computer-executable instructions embodied thereon, wherein when executed by at least one processor, the computer-executable instructions cause the processor to:

store an electronic report in a memory, the electronic report generated based on an electronic report query including a plurality of parameters;

collect access profile data for a user accessing the electronic report, the access profile data including metadata associated with the user accessing the electronic report;

store the access profile data within the memory;

receive an access analytics data request requesting access analytics data associated with the stored electronic report;

retrieve the stored access profile data;

generate an access analysis table based at least in part on the retrieved access profile data, the access analysis table including the access analytics data associated with the stored electronic report; and provide an extract of the access analysis table to a requestor of the access analytics data request, the extract including at least a portion of the access analytics data associated with the stored electronic report, wherein the computer-executable instructions further cause the processor to: (i) provide a web interface to a client system associated with the user wherein the stored electronic report is accessible by the client system from the web interface and (ii) detect the client system accessing the stored electronic report;

wherein the computer-executable instructions further cause the processor to: (i) collect access profile data from a plurality of users permitted to access the stored electronic report, (ii) generate the access analysis table based in part on the collected access profile data of the plurality of users, (iii) identify at least one user of the plurality of users that has not accessed the stored electronic report based on the access analysis table, and (iv) revoke access to the stored electronic report for the identified at least one user.

18. The computer-readable storage media in accordance with claim 17, wherein the computer-executable instructions further cause the processor to:

store the plurality of parameters within the memory;

retrieve the plurality of parameters in response to the received access analytics data request; and generate the access analysis table based in part on the plurality of parameters.

19. The computer-readable storage media in accordance with claim 17, wherein the plurality of parameters include at least one of access level, language, report type, business group, time period, report schedule, and type of client data.

20. The computer-readable storage media in accordance with claim 17, wherein the computer-executable instructions further cause the processor to:
   retrieve a user profile associated with the user accessing the generated report; and
   collect access profile data from the user profile.

21. The computer-readable storage media in accordance with claim 17, wherein the computer-executable instructions further cause the processor to receive the access analytics data request through the web interface.

22. The computer-readable storage media in accordance with claim 17, wherein the computer-executable instructions further cause the processor to:
   generate a plurality of electronic reports based on the plurality of parameters; and
   collect access profile data for each report of the plurality of electronic reports.

23. The computer-readable storage media in accordance with claim 22, wherein the computer-executable instructions further cause the processor to:
   receive an access analytics data request associated with the plurality of electronic reports;
   retrieve the collected access profile data of the plurality of electronic reports;
   generate the access analysis table based on the retrieved access profile data, the access analysis table including access analytics data associated with the plurality of electronic reports;
   analyze the access analysis table;
   identify a first report of the plurality of electronic reports that has not been accessed within a predetermined period of time; and
   tag the access analytics data associated with the first report as inactive.

24. The computer-readable storage media in accordance with claim 17, wherein the computer-executable instructions further cause the processor to:
   compare the access analysis table to a predetermined access threshold representing report access activity; and
   automatically delete the stored electronic report based on the comparison.

* * * * *